Oct. 21, 1969   D. L. ORLOFF   3,473,579
VOLUMETRIC METERING STUFFER
Filed March 27, 1967   5 Sheets-Sheet 1
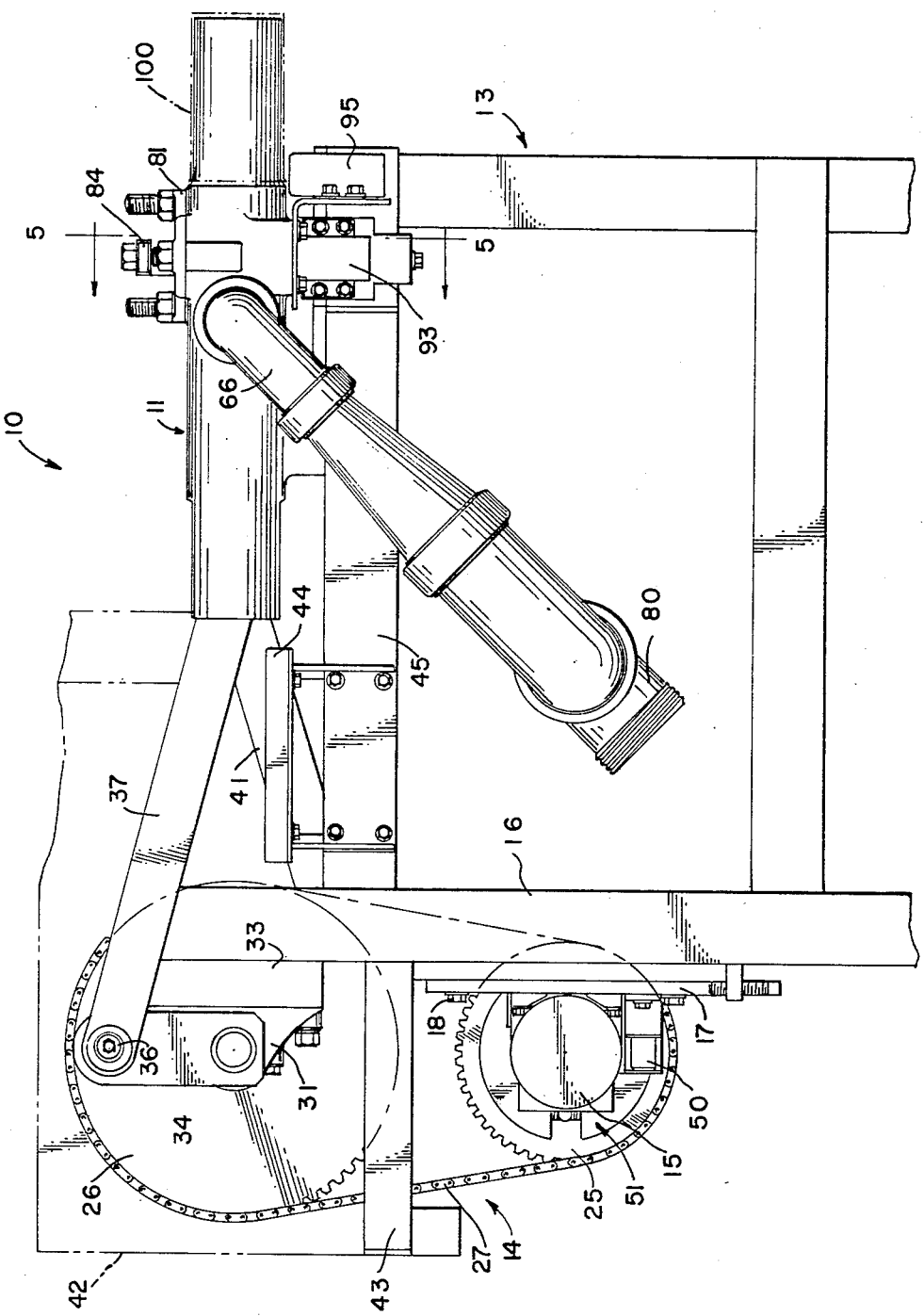
INVENTOR
DANIEL L. ORLOFF
BY Greist, Lockwood,
Greenawalt & Dewey   ATT'YS.

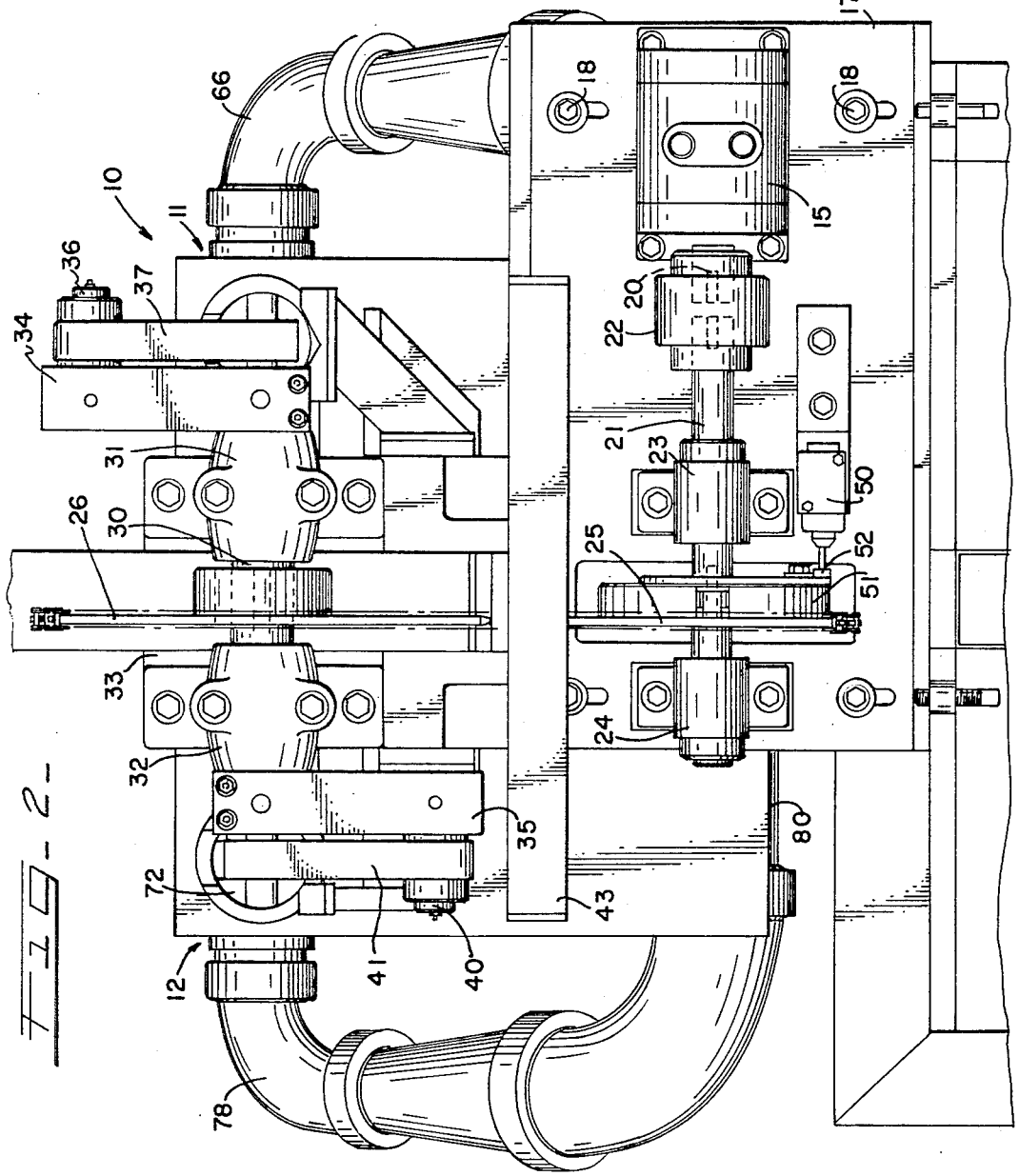

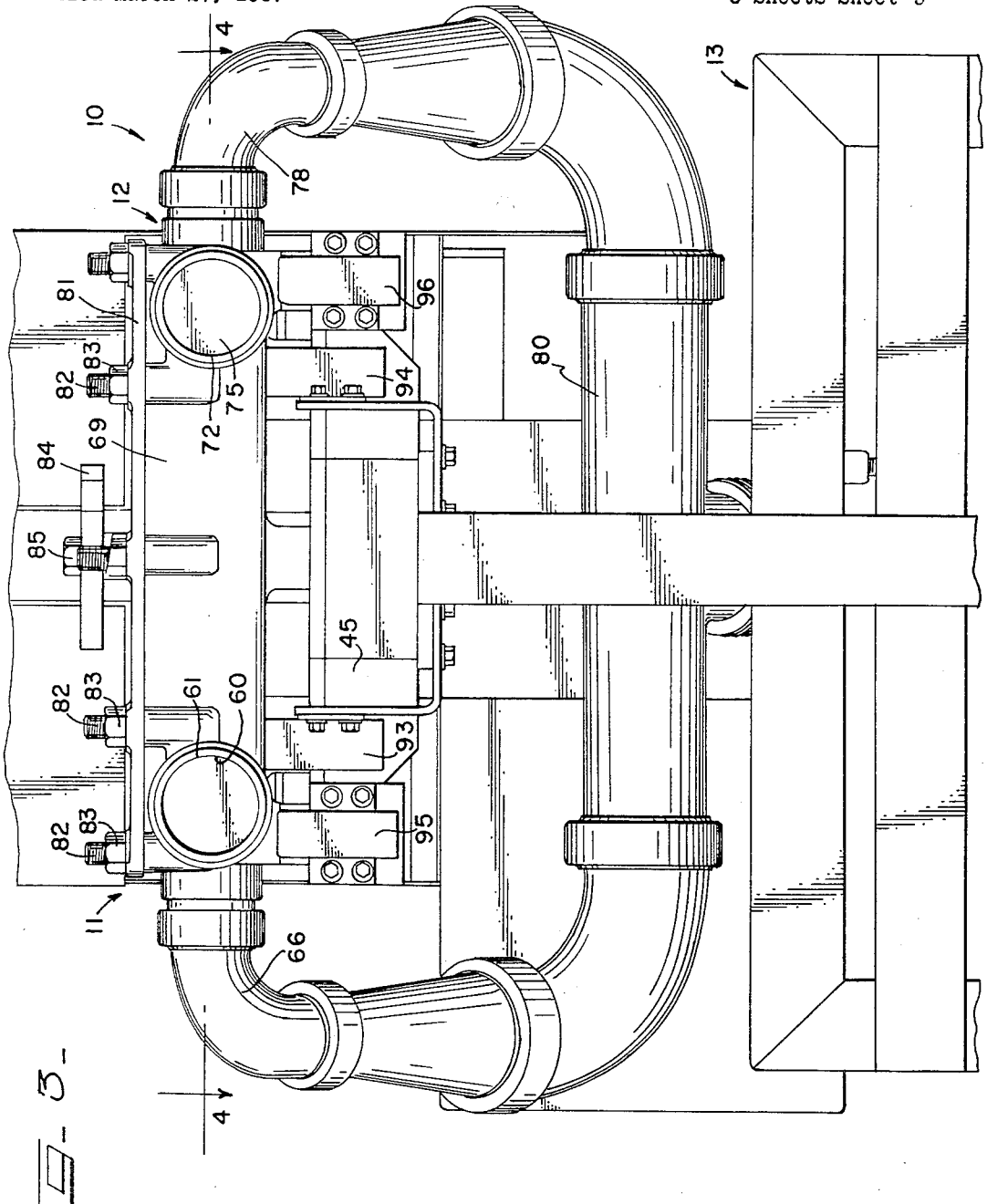

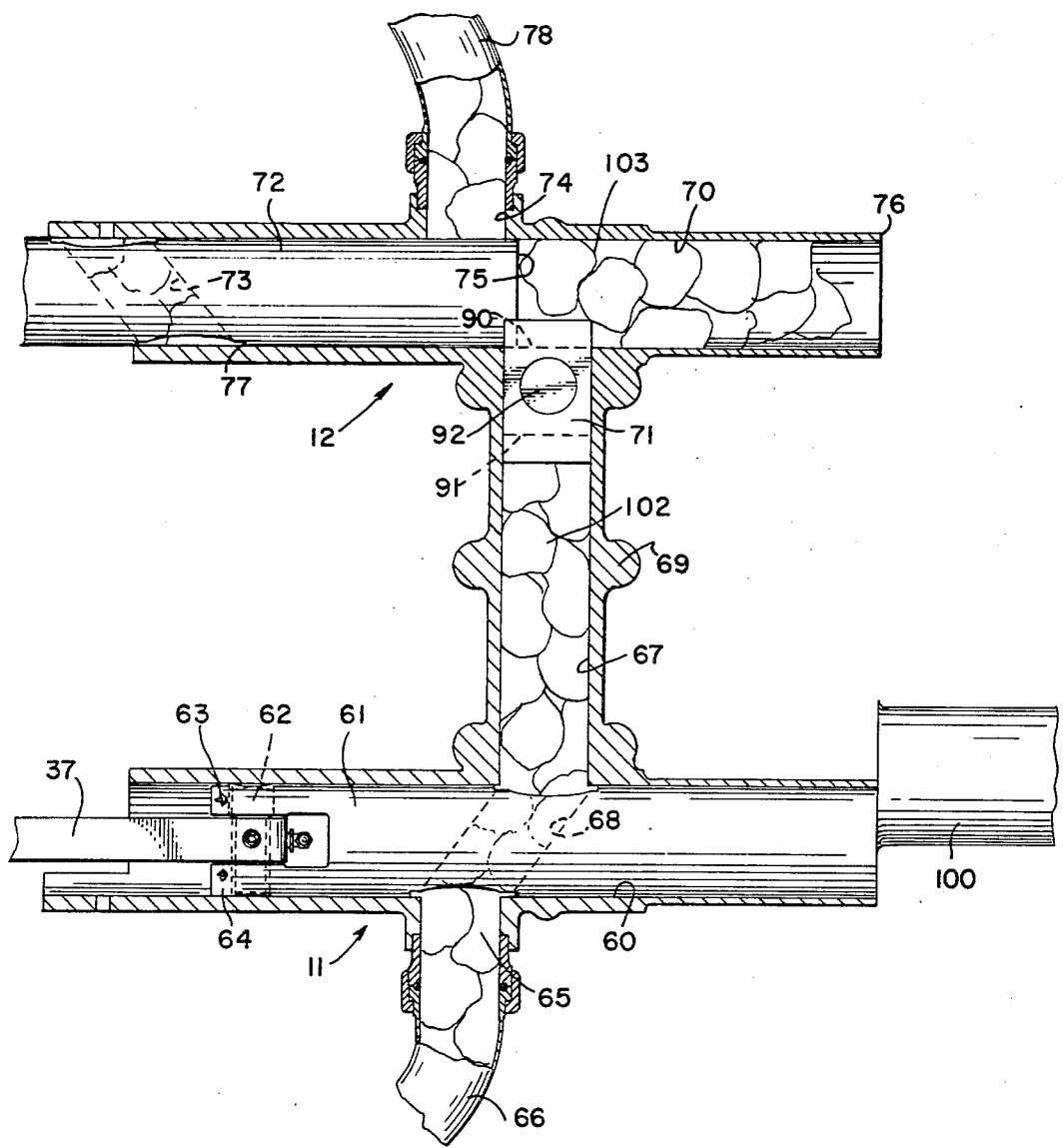

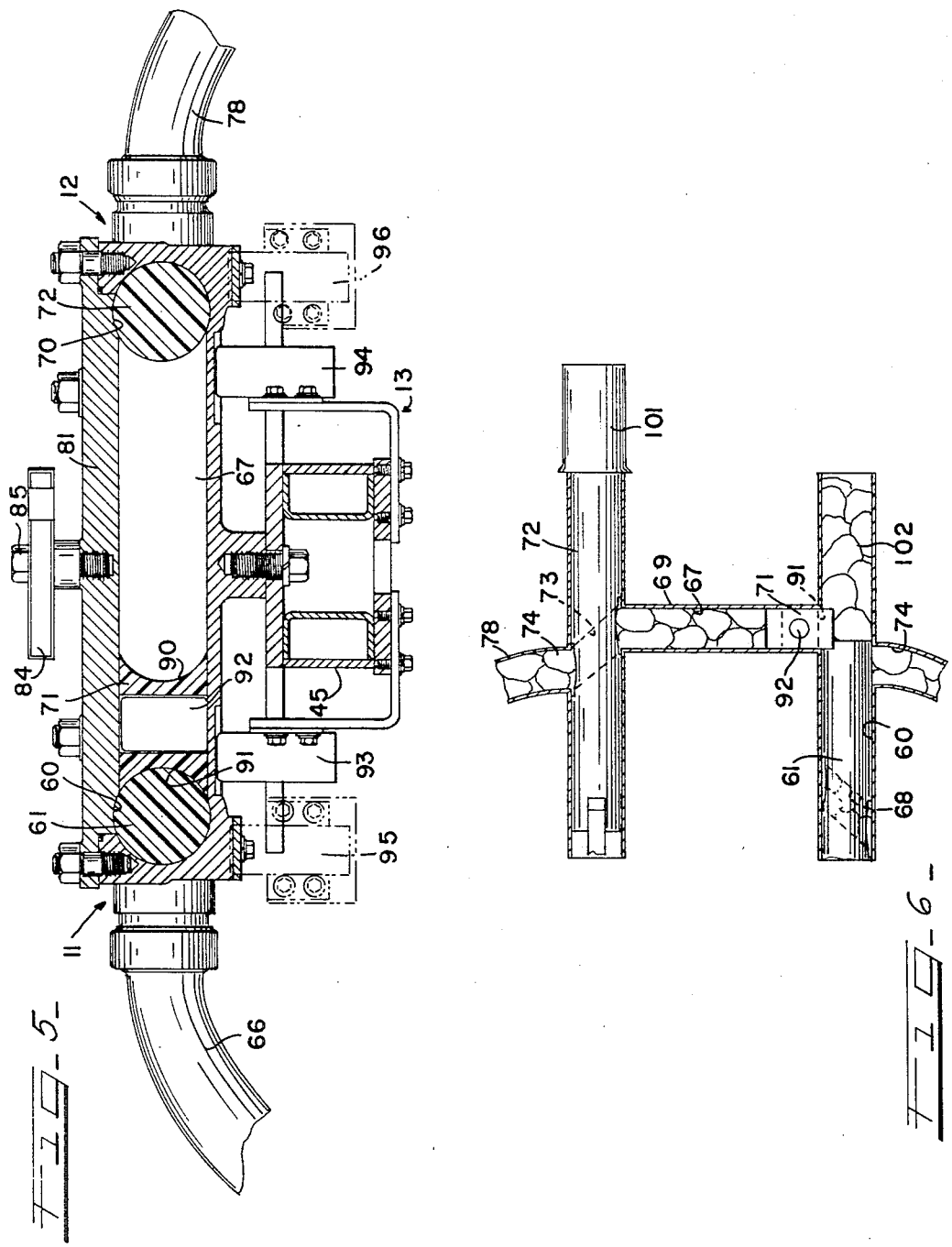

United States Patent Office 3,473,579
Patented Oct. 21, 1969

1

3,473,579
VOLUMETRIC METERING STUFFER
Daniel L. Orloff, Madison, Wis., assignor to Oscar Mayer & Co., Inc., Chicago, Ill., a corporation of Illinois
Filed Mar. 27, 1967, Ser. No. 626,136
Int. Cl. B65b 43/54
U.S. Cl. 141—156           9 Claims

ABSTRACT OF THE DISCLOSURE

Volumetric metering dispenser having rams disposed in ram housings which are joined by a metering passageway having a freely movable piston therein. The rams are self-valving and their movement is co-ordinated so that when one ram is advancing to dispense, the other ram is retracting. Product is admitted to the metering passageway through ports in the rams and when the one ram is in the dispensed position, the incoming product which flows through the port fills the metering passageway with a newly metered quantity and moves the free piston in the passageway, discharging the previously metered quantity of product into the path of the retraced ram so it may advance to dispense the product while the advanced ram is retracting to receive the newly metered quantity in its path.

---

This invention relates to product dispensing means and, more particularly, to a metering stuffer in which the product is packaged by volume, as opposed to conventional techniques which package the product by weight. More specifically, the present invention is directed to a new and improved volumetric stuffing arrangement which permits the packaging of meat products and the like by volume, while avoiding problems of underfilling or overfilling when the product so packaged is to be sold by weight measure.

In the packaging of foodstuffs and the like and in particular meat products, filling tolerances are very narrow. Obviously, any overfill serves to reduce the profit on the product, while underfilling can constitute a violation of the law if not corrected before distribution and sale. Accordingly, it is the practice of the industry to have a zero or close to zero tolerance on underfill and only a slight overfill tolerance. In the packaging operations of the past, each container was weighed and part of the product added or subtracted to bring the weight into conformity with the requirements established. In the packaging of meat products such as canned hams and the like, this materially increased the cost of packaging with the resultant effect on the cost of the finished product.

The present invention relates to a product dispenser which dispenses meat products by volume and corrects the problems noted above. Because the density per unit volume of meat products is maintained uniform and the volume is maintained constant when using the present invention, it follows that the weight of the product for a metered volume will also be constant. Accordingly, the cut-and-try methods of hand weighing and adding and subtracting product to obtain the proper weight are avoided. Needless to say, the packaging operation with the product dispenser of the present invention is expedited with a reduction in the labor required, while obtaining almost complete uniformity in the weight of each of the packages merely by maintaining the volume constant. This is achieved through a unique volumetric metering or stuffing arrangement, which will be described in detail below.

It is an object of this invention to provide a new and improved product dispenser particularly adapted for use in measuring and dispensing a product by volume.

2

It is a further object of this invention to provide a new and improved product dispenser which permits packaging by volume to maintain a uniform weight of the product dispensed.

It is a still further object of this invention to provide a new and improved volumetric metering stuffer particularly adapted for use in packaging of meat products and the like by measuring a selected volume and dispensing the same into a package or container.

It is a further object of this invention to provide a volumetric metering stuffer in which the volume may be easily adjusted.

Additional objects other than those specifically stated will become apparent on reference to the following description made in conjunction with the accompanying drawings wherein:

FIGURE 1 is a side elevational view of the product dispenser of the present invention;

FIGURE 2 is a rear elevational view of the product dispenser of FIGURE 1;

FIGURE 3 is a front elevational view of the product dispenser shown in FIGURE 1;

FIGURE 4 is a fragmentary cross-sectional view taken generally along the line 4—4 of FIGURE 3;

FIGURE 5 is a cross-sectional view taken generally along the line 5—5 of FIGURE 1; and FIGURE 6 is a schematic plan view of the rams in a reversed position from that illustrated in the cross-sectional view of FIGURE 4.

The product dispenser or volumetric metering stuffer is indicated generally by reference numeral 10, being shown in side elevation in FIGURE 1, rear elevation in FIGURE 2, and front elevation in FIGURE 3. The volumetric metering stuffer 10 includes a pair of cylinders or ram housings 11 and 12 which are spaced apart and may be parallel to each other. The stuffer 10 may be mounted on a frame, indicated generally at 13, which positions the ram housings 11 and 12 at a suitable elevation for ease of attending by a filling operator.

The metering stuffer 10 includes a drive assembly 14 which is adapted to reciprocate the rams disposed in the ram housings 11 and 12. The mechanical drive arrangement 14 includes a rotary actuator 15 which is attached to a vertical frame member 16 forming a part of the frame 13 through the provision of a mounting plate 17 and suitable bolts 18. The rotary actuator 15 has an output shaft 20 joined to a drive shaft 21 through the provision of a coupling member 22, as best seen in FIGURE 2. The drive shaft 21 is mounted for rotation in a pair of spaced bearing blocks 23 and 24 which are joined to the mounting plate 17 by suitable fasteners or the equivalent.

Between the bearing blocks 23 and 24, a drive sprocket 25 is mounted for rotation with the shaft 21 and, as best seen in FIGURE 1, drives a larger sprocket 26 through an endless chain belt 27. Referring again to FIGURE 2, the upper or larger sprocket 26 is mounted for rotation on a shaft 30, which shaft is supported for rotation by bearings 31 and 32 mounted on the upper part of the frame 16 through a mounting plate 33. The shaft 30 projects beyond the ends of the bearings 31 and 32 and receives crank arms 34 and 35. The crank arm 34 is provided with a pin 36, eccentrically dispersed relative to the shaft 30, for connecting the arm 34 to a reciprocable piston rod 37, having the other end attached to the ram or piston in the ram housing 11. The details of such connection will be given hereinafter.

In a similar manner, the crank arm 35 is provided with an eccentrically positioned pin 40, which receives one end of the piston rod 41 while the other end is adapted for attachment to the piston or ram in the ram housing 12. As is apparent in FIGURES 1 and 2, the crank arms are located on radii 180° apart and, on application of rotational motion to the large sprocket 26, cause the associated piston rods 37 and 41 to move in opposite directions.

The rotary actuator 15 is of conventional type which imparts an oscillating motion to the sprocket 25 and, in the present design, is fluid driven for oscillation through the desired angle. A solenoid operated valve or the equivalent controls the flow of fluid to the actuator.

A safety cover, indicated in broken away, phantom lines at 42 in FIGURE 1, is carried on the bracket 43 and an elevated bracket 44 mounted on the transverse frame member 45 to keep the moving parts of the mechanical drive 14 enclosed for protection of the operators and also to protect the mechanism from foreign materials during operation. Such cover may be electrically integrated into the electrohydraulic system to render the entire mechanical drive 14 inoperable unless it is in position as a safety precaution.

The sprocket 25 may be stopped in the 90° or mid position by a limit switch 50 which engages a hub 51 having a cam operator 52 thereon. The hub is joined to the sprocket 25 for rotation through conventional means and the limit switch, when placed in the circuit and actuated, is operative to stop the rotational movement of the sprocket 25. This also positions both rams in the mid position and the entire stuffing unit may be disassembled for cleaning. The operation of the mechanical drive 14 will be given in greater detail with the description of the operation of the product dispenser or stuffer 10.

Referring now to FIGURE 4, the ram housing 11 includes a cylindrical bore 60 which receives a piston or ram 61 for reciprocation therein. Movement of the ram 61 is achieved by a cross pin 62, joining bifurcated end portions 63 and 64 to the piston rod 37. The cylindrical bore includes a product inlet opening 65 which communicates with a supply line 66 (shown fragmentarily). A metering passageway 67 has one end thereof communicating with the cylindrical bore 60 and when the piston 61 is disposed in the position illustrated, the metering passageway 67 is placed in communication with the inlet opening 65 through a cross channel or passageway 68 in the piston 61. The opposite end of the metering passageway communicates with the cylindrical bore 70 of the ram housing 12. A free piston 71 isolates one cylindrical bore from the other.

The ram housing 12 is provided with cylindrical bore 70 receiving a ram or piston 72 which is joined to the piston rod 41 in the same fashion that the piston 61 is joined to the piston rod 37. The piston 72 is also provided with an angulated cross channel 73 which provides for communication between an inlet opening 74, communicating with the metering passageway 67 through the cross channel 73 when the piston 72 has the end 75 aligned with the end of the ram housing 76. The inlet opening 74 communicates with a product inlet line 78 which is joined to the product inlet 66 through a T fitting 80 (FIGURES 1 and 3).

As is apparent in the top plan view of FIGURE 4, opposite ends of each of the cross channels 68 and 73 are counterbored, as indicated at 77 on the piston 72. The counterbore provides a right-angled surface to enhance shearing of the product when the cross channel is reciprocated past the inlet and metering passageways. If desired, a hardened metallic or plastic insert may be provided in the counterbore to reduce the wear and further enhance the cutting action. However, to date, satisfactory performance has been achieved by merely forming the counterbore in the cross channel of the piston 72 at right angles to the axis of the piston 72 which may be formed of Delrin or an equivalent type of plastic. Obviously, the counterbore may be provided on one or both ends of the cross channels 68 and 73 while, with some products, it may not be required. As noted, the product inlet lines 66 and 78 are joined to a T fitting 80, as seen in FIGURE 3 which, in turn, is joined through appropriate piping to a product supply pump of any suitable type. In the present invention, good results have been achieved through deaeration of the product, with pumping through the T fitting achieved by a pumping arrangement disclosed in co-pending application Ser. No. 533,359, filed Mar. 10, 1966.

The housing 69 which forms the chamber 67 for the free piston 71 is illustrated in full elevation in FIGURE 3 and includes a top cover 81, which is fluid tightly fastened to the housing 69 by means of studs 82 and cooperating nuts 83. A lifting handle 84 is mounted in the center of the cover and is rotatable 90° to overlie the associated fasteners and permit camming off of the cover through the rotation of the handle 84 about the bolt 85. This permits access to the metering passageway for clean-up purposes, or to permit adjustment of the metering volume through changing or modifying the free piston length.

The cross-sectional view of FIGURE 5 is taken through the center of the bore of the metering passageway 67 when the pistons 61 and 72 have the end faces thereof aligned and the metered volume is trapped in the passageway 67. The free piston, as is apparent, has arcuate end surfaces 90 and 91, which are adapted to conform to the shape of the pistons 61 and 72. In cross section, the free piston 71 is rectangular to conform to the shape of the metering passageway 67.

In the center of the free piston 71 is provided an opening receiving a ferromagnetic core 92 which operates to actuate magnetic sensors 93 and 94 positioned at opposite ends of the metering passageway 67. The function of the sensors and ferromagnetic core 92 will be given in conjunction with the description of the operation of the volumetric metering stuffer 10. Additional magnetic sensing means is provided at 95 and 96, as shown in FIGURE 3, which sensing means is responsive to identify the presence of a container positioned over the stuffing or dispensing end of the ram housings 11 and 12. The function of this sensing means will be described in greater detail in conjunction with the description of the operation of the stuffer. The magnetic sensors may be of any suitable type such as the type 7FB-42, sold by Minneapolis-Honeywell, or an equivalent design which operates to sense the presence of a ferromagnetic element and respond by closing a switch. Obviously, mechanically actuated limit switches could be used, however, the magnetic-type is preferred for sanitary and operational reasons.

The free piston 71 is free to move in the metering passageway 67 between the cylindrical bores 60 and 70. The relationship of the cylinders 61 and 72 is such that, at the limit of the retracting stroke, a small portion of the associated piston partially blocks the end of the metering passageway 67 to form a stop for engagement by the free piston. The stroke limits for each of the pistons is illustrated in the schematic view of FIGURE 6 and the cross-sectional view of FIGURE 4, respectively.

In operation, the product dispensing or stuffing system can be used to fill preshaped containers such as the cans 100 and 101, shown in FIGURES 4 and 6. A start-up procedure is provided which includes loading the vat or supply with the product to be metered. In the case of meat products, it is desirable to subject the product to a vacuum prior to pumping into the volumetric metering stuffer. Of necessity, the pumping system is sealed at all the joints to provide complete isolation from the ambient for sanitary reasons and to maintain product density substantially uniform. The product is pumped through the T fitting 80 where it divides, flowing through the conduits 66 and 78 and through the respective product inlets 65 and 74, depending, of course, on the position of the pistons.

Assuming the pistons are in the position shown in FIGURE 4 and product is available, the product to be metered is supplied through the inlet 65, cross channel 68 and under the force developed by the product 102 entering the metering passageway, the free piston 71 is moved until the arcuate end 90 engages the side of the piston 72. At this time, the passageway 67 is filled with product, indicated at 102, the product still remaining under the evacuated conditions imposed prior to pumping. The movement of the free piston to this position causes discharge of the previously metered charge of product 103 into the path of the piston 72. The ferromagnetic core 92 in the free piston 71 is now disposed over the magnetic sensor switch 94, causing it to close. When a can is placed over the end 76 of the ram housing 12, the magnetic sensor operates a switch initiating actuation of the mechanical drive 14 and causing the charge of product, shown at 103, to be ejected by the piston 72 into a container. In order for stuffing to commence, however, a container such as the can, shown at 101 in FIGURE 6, must be placed over the stuffing horn with the bottom of the can adjacent the end 76 of the cylinder. At such time, the upper end of the can is located in close proximity with the magnetic sensor 94. This condition for initiating filling applies to the other ram housing 11, as represented by the can 100, shown in phantom in FIGURE 1, on the ram housing 11. When both magnetic sensors 93 and 95 detect these two conditions, that is, (1) the free piston is at the end of the passageway 67 so that the contents have been ejected into the cylinder 70, and (2) a container is in position for bottom filling, a solenoid operated valve opens and hydraulic fluid is applied to the rotary actuator 15, causing the rotation of the sprocket 25 to drive the sprocket 26 and move the piston 72 until the flat face 75 is aligned with the end 76 of the cylinder, thus forcing the entire charge 103 into the can. As is evident, each pair of the magnetic sensors is wired in series so that both must be closed before the associated solenoid will operate the valve. Any valve such as a spool-type valve may be used with one solenoid operating the valve to perimt actuation in one direction while the other solenoid will permit rotary operation in a reverse direction. After metering is complete, the product is exposed to atmosphere, however, this is of no cosequence as the volume has been measured previously while under evacuated conditions.

When the oscillatory cycle is completed, the relative position of the two pistons will be reversed. The piston 61 is fully retracted, causing the ends of the cross channel 68 to shear the product at the product inlet 65 and at the inlet to the metering passageway 67. The product is retained in the cross channel 68 and carried with the piston as it moves to the fully retracted position shown in the schematic view of FIGURE 6. At this time, the can 101 on the ram housing 12 has moved outwardly from the force of the product 103 against the bottom. The filling operator will resist the can movement for uniform void-free filling and may use the lip of the can 101 to wipe the piston face 75 clean, as it is aligned with the end 76 of the cylinder or ram housing 12 at the completion of the stroke. The can may be placed on a conveyor and checked for accuracy, if desired, by automatically weighing in a well-known manner.

Simultaneously with the piston 72 reaching its limit, the cross channel 73 is aligned with the product inlet 74 and the inlet to the metering passageway 67. Product is allowed to flow through the corss channel 73 into the metering passageway, causing the free piston 71 to move to the position shown in FIGURE 6. The magnetic sensor 94 detects the absence of the ferromagnetic element 92, causing the switch to open. Thus, even if a can is placed on the end or cylinder, stuffing will not occur as the two conditions set out above are not fulfilled. However, when the free piston 71 reaches the limit position shown in FIGURE 6, having been moved to this position by the force of product flowing through the inlet 74, cross channel 73 and into the metering passageway 67, the magnetic sensing element 93 for the ram housing 11 is actuated by the presence of the ferromagnetic element 92, indicating that the previously metered charge of product 102 has been ejected into the cylindrical bore 60. It can be appreciated that the charge of product 102 is ejected into the cylinder 60 by the free piston forcing the same out of the metering passageway 67 as it is moved to the position shown by the force of the incoming product. The end wall 91 on the free piston 71 engages the side wall of the piston 61, causing it to stop when all the metered product is ejected.

The operator positions a can over the end of the stuffing cylinder, as shown at 100 in phantom lines in FIGURE 1. As noted above, the two conditions are fulfilled and stuffing may commence. The rotary actuator is energized to operate in a reverse direction to move the piston 61 to the position 102 into the can 100. The can may be wiped on the end of the cylinder as described above to assure that all the product metered actually is packaged.

Because of the location of the cross channels 68 and 73, the metering passageway 67 may not be filled until the associated piston has completed its stroke. The offset relation between the metering passageway 67 and the product inlets 65 and 74 permits the metering passageways 67 to communicate with the cylinder while the pistons block the associated product inlet. The severing action caused by the cross channel being moved past the metering passageway and product inlets provides a clean cut without tearing or pulling, assuring that the passageway 67 will maintain the correct metered volume.

The present invention has been used to stuff food products in the form of small hams and the like, wherein the individual particles were of varying weights up to four pounds. Maintaining constant volume permits an exact fill within the limitations normally imposed by weight filling. Submerged or bottom filling of the container is permitted to substantially eliminate air pockets. It is to be appreciated that the particle sizes are substantially uniform and product trimming is minimized. Only practicality places a limitation on particle size, as the piping and valving can be uniform for all particle sizes handled.

While one preferred form of mechanical drive has been illustrated in conjunction with describing the metering stuffer of the present invnetion, it is obvious that suitable substitutes may be provided, for example, a reciprocating hydraulic cylinder or the equivalent. If readily flowable materials are to be metered with the present invention, the ram housings may be elevated a sufficient degree to keep the product from flowing out the open end after it has been metered and discharged into the path of the piston. While the pistons or ram have been shown as being circular in cross section and the free piston rectangular, it is obvious that both may be made rectangular or both may be made cylindrical with suitable keying to maintain the two in proper relation. The size of the stuffing end of the ram can be increased or decreased in length as required by the volume of product to be stuffed with each stroke.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A product dispenser means for use in measuring and dispensing a product by volume comprising first and second elongate ram housings arranged in parallel relation, first and second product inlets feeding laterally into said ram housigns, a ram disposed in each of said ram housings for movement between a discharge position and a retracted position, a volumetric metering passageway joining said ram housings, each of said rams having a passageway connecting its associated product inlet with said volumetric metering passageway when in retracted position, a free piston disposed in said volumetric metering passageway and movable between said first and second rams, means to reciprocate said rams alternately in opposite directions whereby one of said rams will be retracted to bring the end thereof into a position to permit a measured volume of product to be ejected from said metering passageway into the path thereof while the other of said rams is advancing to bring the end thereof to the end of the associated ram housing thereby to discharge the measured volume of product previously ejected into the path thereof.

2. The product dispenser of claim 1 wherein said volumetric metering passageway is of polygonal cross section and said free piston has arcuate ends generally conforming to the contour of said rams.

3. A product dispenser means for use in measuring and dispensing a product by volume comprising first and second ram housings, first and second product inlets feeding laterally into said ram housings, a ram disposed in each of said ram housings, a volumetric metering passageway joining said ram housings, a freely movable piston disposed in said volumetric metering passageway and movable between limits defined by side walls of said first and second rams, means to reciprocate said rams in opposite directions whereby one of said rams will be retracted to permit a measured volume of product to be ejected into the path thereof while the other of said rams is advancing to the end of the associated ram housing thereby to discharge the measured volume of product previously ejected into the path thereof, each of said rams having a cross channel therein to permit communication between one end of said metering passageway and the associated one of said product inlets, the cross channel of the advanced ram being aligned with said metering passageway when the other of said rams is fully retracted whereby said metering passageway may be filled, moving the free piston toward the retracted ram and thereby serve to discharge the previously measured volume of product in the path of said retracted ram.

4. The product dispenser of claim 3 wherein said cross channel has a side wall portion thereof disposed at right angles to the path of movement of said ram to provide good shearing action.

5. The product dispenser of claim 3 wherein sensing means is provided to energize said means to reciprocate said rams, said sensing means including means to detect the location of said free piston and means to detect the presence of a container before initiating operation of said means to reciprocate said rams.

6. A product dispenser means for use in measuring and dispensing a product by volume comprising first and second ram housings, first and second product inlets feeding laterally into said ram housings, a ram disposed in each of said ram housings, a volumetric metering passageway joining said ram housings and freely communicating therewith, a free piston disposed in said volumetric metering passageway, said free piston being movable in said passageway bewteen limits adjacent said first and second rams, means to reciprocate said rams in opposite directions whereby one of said rams will be retracted with an end portion thereof past said metering passageway to permit a measured volume of product to be ejected into the path thereof while the other of said rams will be advanced to the end of the associated ram housing thereby to discharge the measured volume of product previously ejected into the path thereof, said advancing ram having a cross channel passageway therein which permits communication between said product inlet and said metering passageway whereby said incoming product will move said free piston to eject said measured volume of product into the path of said retracted ram.

7. A product dispenser as set forth in claim 1 and each of said rams having a cross channel which permits communication between the associated product inlet and said metering passageway when the associated ram is fully advanced, said product inlet being offset relative to said metering passageway to permit valving by said ram.

8. A product dispenser means for use in measuring and dispensing a product by volume comprising first and second ram housings, first and second product inlets feeding laterally into said ram housings, a ram disposed in each of said ram housings, a volumetric metering passageway joining said ram housings, a free piston disposed in said volumetric metering passageway and movable between said first and second rams, means to reciprocate said rams alternately in opposite directions whereby one of said rams will be retracted permitting a measured volume of product to be ejected into the path thereof while the other of said rams is advancing to the end of the associated ram housing thereby to discharge the measured volume of product previously ejected into the path thereof, and sensing means to actuate said means to reciprocate said ram, said sensing means being responsive to the said free piston being adjacent the fully retracted ram and a container means in a position to be filled and thereby actuating said means reciprocating said rams for product dispensing.

9. A product dispensing means for use in measuring and dispensing a product by volume comprising first and second ram housings, first and second product inlets feeding laterally into said ram housings, a ram disposed in each of said ram housings, a freely movable piston disposed in said volumetric metering passageway and movable between limits defined by side walls of said first and second rams, means to reciprocate said rams in opposite directions whereby one of said rams will be retracted to permit a measured volume of product to be ejected into the path thereof while the other of said rams is advancing to the ends of the associated ram housing thereby to discharge the measured volume of prdouct previously ejected into the path thereof, each of said rams having a cross channel which permits communication between the associated product inlet and said metering passageway when the associated ram is fully advanced, and an end portion of said cross channel being disposed at right angles to the path of ram movement for clean shearing of said product at said product inlet with said metering passageway.

References Cited

UNITED STATES PATENTS

| | | | |
|---|---|---|---|
| 1,502,110 | 7/1924 | Mojonnier et al. | 141—98 X |
| 3,119,381 | 1/1964 | Cummins | 222—249 X |

HOUSTON S. BELL, Jr., Primary Examiner

U.S. Cl. X.R.

17—35, 38; 100—209; 141—248, 258; 222—249

PO-1050
(5/69)

UNITED STATES PATENT OFFICE
CERTIFICATE OF CORRECTION

Patent No. 3,473,579      Dated October 21, 1969

Inventor(s) Daniel L. Orloff

It is certified that error appears in the above-identified patent and that said Letters Patent are hereby corrected as shown below:

Column 1, line 22, cancel "retraced" and insert -- retracted --
Column 6, line 16, after "position" insert -- shown in Figure 4 and thus eject the metered product --
Column 6, line 24 cancel "ways" and insert -- way --
Column 6, line 50, cancel "ram" and insert -- rams --

**SIGNED AND
SEALED
MAY 12 1970**

(SEAL)
Attest:

Edward M. Fletcher, Jr.
Attesting Officer

WILLIAM E. SCHUYLER, JR.
Commissioner of Patents